(12) United States Patent
Sato (10) Patent No.: US 6,337,713 B1
(45) Date of Patent: Jan. 8, 2002

(54) PROCESSOR FOR IMAGE-PIXEL SIGNALS DERIVED FROM DIVIDED SECTIONS OF IMAGE-SENSING AREA OF SOLID-TYPE IMAGE SENSOR

(75) Inventor: Koichi Sato, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/050,985

(22) Filed: Mar. 31, 1998

(30) Foreign Application Priority Data

Apr. 4, 1997 (JP) .............................................. 9-102750

(51) Int. Cl.[7] .................................................. H04N 3/14
(52) U.S. Cl. ........................ 348/311; 348/312; 348/320; 348/321
(58) Field of Search ................................. 348/187, 218, 348/311, 316, 323, 320, 321, 322, 312; 358/525, 540, 450, 483

(56) References Cited

U.S. PATENT DOCUMENTS

| | | | |
|---|---|---|---|
| 4,692,812 A | * 9/1987 | Hirahara et al. | ............ 358/483 |
| 4,797,942 A | * 1/1989 | Burt | ............................ 348/218 |
| 4,980,771 A | * 12/1990 | Ueda et al. | ................. 348/323 |
| 5,285,286 A | * 2/1994 | Kannegundla | ............... 348/187 |
| 5,396,091 A | * 3/1995 | Kobayashi et al. | ......... 348/320 |
| 5,606,427 A | 2/1997 | Sato | |
| 5,727,116 A | 3/1998 | Sato | |
| 5,896,172 A | * 4/1999 | Korthout et al. | ............. 348/312 |
| 5,969,759 A | * 10/1999 | Morimoto | .................... 348/323 |

* cited by examiner

Primary Examiner—Wendy R. Garber
Assistant Examiner—Luong Nguyen
(74) Attorney, Agent, or Firm—Greenblum & Bernstein, P.L.C.

(57) ABSTRACT

An image-pixel signal processor is used to process image-pixel signals obtained from an image-sensing area, divided into a first section and a second section, of a solid-type image sensor. The processor has an image-pixel signal reader, which simultaneously and correspondingly reads two respective series of image-pixel signals line by line from the sections. A leading signal of the image-pixel signals, included in each line, is farthest away from a boundary between the sections, and a trailing signal of the image-pixel signals, included in each line, is nearest to the boundary. The processor has a regulator, which correspondingly regulates differences in level between the signals in each line derived from the first section, and the corresponding signals in each line derived from the second section, so that a gradual reduction occurs, resulting in both levels of the trailing signals, derived from the sections, being substantially coincident with each other.

18 Claims, 7 Drawing Sheets

PROCESSOR FOR IMAGE-PIXEL SIGNALS DERIVED FROM DIVIDED SECTIONS OF IMAGE-SENSING AREA OF SOLID-TYPE IMAGE SENSOR

BACKGROUND OF THE INVENTION

1. Field of the Invention

The present invention relates to an image-pixel-signal processor used in, for example, an electronic video camera having a solid-type image sensor, and, in particular, to an image-pixel-signal processor for processing image-pixel signals derived from divided sections of an image-sensing area of a solid-type image sensor.

2. Description of the Related Art

In an electronic camera, a solid-type image sensor, such as a CCD (charge-coupled device) image sensor, is used to photoelectrically convert an optical objective image into a frame of image-pixel signals. The optical objective image is reproduced based on a video signal generated from the frame of image-pixel signals, which have been subjected to suitable processing.

Recently, there has been a demand for the reproduced image to have a higher resolution. A resolution of the reproduced image depends on a number of image-pixel signals included in one frame, which then corresponds to a number of CCD elements included in the CCD image sensor. As is well known, the CCD elements are arranged in a matrix on an image-sensing area or light-receiving area of the CCD image sensor. To obtain a reproduced image with a high resolution, the number of CCD elements must be increased. In this case, the increase in the number of CCD elements is exponential, because of the matrix arrangement of the CCD elements on the image-sensing area of the CCD image sensor.

On the other hand, a CCD image sensor, having a large number of CCD elements, produces a detrimental effect on the reading time of a frame of image-pixel signals from the CCD image sensor. To solve this problem, it is proposed that the image-sensing area of the CCD image sensor is vertically and/or horizontally divided into at least two sections; that image-pixel signals are simultaneously read from the divided sections of the image-sensing area; and that the read image-pixels are reintegrated to form a frame of image-pixel signals. Thus, the reading of the image-pixel signals from the CCD image sensor can be carried out in a short time.

Nevertheless, a boundary between two adjacent sections of the image-sensing area may be apparent on a reproduced image as a difference of luminous intensity between two image areas, corresponding to the two adjacent sections, of the reproduced image, because an average level of the image-pixel signals, derived from one of the two adjacent sections, may be different from an average level of the image-pixel signals, derived from the other section.

In particular, for example, the respective image-pixel signals, read from the two adjacent sections, are successively amplified by two amplifiers. In this case, although the amplifiers used are the same products, it cannot be ensured that the amplifiers exhibit the same amplification characteristic. Accordingly, the respective average levels, derived from the two adjacent sections, may be different from each other, and thus the boundary between the two adjacent sections of the image-sensing area may be apparent on the reproduced image as a difference of luminous intensity between the two image areas.

Also, in manufacturing a large-sized CCD image sensor having a large number of CCD elements, at least two small-sized CCD image sensors, each having a small number of CCD elements, are frequently combined with each other to construct the large-sized CCD image sensor. Of course, in this case, image-pixel signals are simultaneously read from the combined small-sized CCD image sensors, and the read image-pixel signals are reintegrated to form a frame of image-pixel signals. Similar to the above-mentioned case, a boundary between two adjacent combined CCD image sensors may be apparent on a reproduced image as a difference of luminous intensity between two image areas, corresponding to the combined small-sized CCD image sensors, of the reproduced image, because of different characteristics between the combined CCD image sensors and different characteristics between amplifiers incorporated into the combined CCD image sensors.

SUMMARY OF THE INVENTION

Therefore, an object of the present invention is to provide an image-pixel-signal processor for processing image-pixel signals derived from divided sections of an image-sensing area of a solid-type image sensor, wherein a boundary between two adjacent sections of the image-sensing area is not apparent as a difference between luminous intensities on a reproduced image.

In accordance with a first aspect of the present invention, there is provided an image-pixel signal processor for processing image-pixel signals obtained from an image-sensing area, divided into a first section and a second section, of a solid-type image sensor. Optionally, the solid-type image sensor may be constructed by combining at least two small-sized solid-type image sensors with each other such that the image-sensing area is formed of a first section and a second section corresponding to image-sensing areas of the small-sized solid-type image sensors, respectively. The processor comprises an image-pixel signal reader, which simultaneously and correspondingly reads two respective series of image-pixel signals line by line from the first and second sections of the image-sensing area. A leading image-pixel signal, of the image-pixel signals included in each line, is farthest away from a boundary between the first and second sections, whereas a trailing image-pixel signal, of the image-pixel signals included in each line, is nearest to the boundary. The processor also comprises a regulator, which correspondingly regulates respective differences between levels of the image-pixel signals in each line derived from the first section, and the corresponding image-pixel signals in each line derived from the second section, so that a gradual reduction occurs, resulting in both levels of the trailing image-pixel signals, derived from the first and second sections, being substantially coincident with each other.

In the first aspect of the present invention, the regulator may comprise a first level-changer for changing a level of each image-pixel signal derived from the first section, a second level-changer for changing a level of each image-pixel signal derived from the second section, a first level-detector for detecting a level of the image-pixel signal outputted from the first level-changer, a second level-detector for detecting a level of the image-pixel signal outputted from the second level-changer, a calculator for calculating a differential level between the levels of the image-pixel signals outputted from the first and second level-changers, and a weight-factor multiplier for multiplying the differential level by a weight-factor, which is cyclically varied from a minimum value to a maximum value. The first and second changers correspondingly change the levels of the image-pixel signals, derived from the first and second sections, on the basis of the differential level multiplied by the cyclically-varied weight-factor, such that the regulation of the respective differences between levels of the image-pixel signals in each line derived from the first section, and the corresponding image-pixel signals in each line derived from the second section, is carried out.

Also, in the first aspect of the present invention, each of the first and second level-changers may comprise a voltage-controlled amplifier, a magnification factor of which is controlled in accordance with a variation of an inputted control voltage, the control voltage being set on the basis of the differential level multiplied by the cyclically-varied weight-factor.

In accordance with a second aspect of the present invention, there is provided an image-pixel signal processor for processing image-pixel signals obtained from an image-sensing area, vertically divided into a first section and a second section, of a solid-type image sensor, wherein a plurality of image-pixel signals is produced in a matrix on each of the first and second sections. Optionally, the solid-type image sensor may be constructed by combining at least two small-sized solid-type image sensors with each other such that the image-sensing area is formed of a first section and a second section corresponding to image-sensing areas of the small-sized solid-type image sensors, respectively, with a vertical boundary being defined between the first and second sections. The processor comprises an image-pixel signal reader, which reads respective series of image-pixel signals, from a leading line of the first and second sections of the image-sensing area, by vertically transferring the image-pixel signals in a line by line succession, and by horizontally transferring a vertically-transferred leading line of the image-pixel signals. A leading image-pixel signal of the image-pixel signals included in each line is farthest from a vertical boundary between the first and second sections, and a trailing image-pixel signal of the image-pixel signals in each line is nearest to the vertical boundary. The processor also comprises a regulator, which correspondingly regulates respective differences between levels of the image-pixel signals in each line derived from the first section, and the corresponding image-pixel signals in each line derived from the second section, so that a gradual reduction occurs, resulting in the levels of the corresponding trailing image-pixel signals, derived from the first and second sections, being substantially coincident with each other.

In the second aspect of the present invention, the regulator comprises a first level-changer for changing a level of each image-pixel signal derived from the first section, a second level-changer for changing a level of each image-pixel signal derived from the second section, a first level-detector for detecting a level of the image-pixel signal outputted from the first level-changer, a second level-detector for detecting a level of the image-pixel signal outputted from the second level-changer, a calculator for calculating a differential level between the levels of the image-pixel signals outputted from the first and second level-changers, and a weight-factor multiplier for multiplying the differential level by a weight-factor, the weight-factor being cyclically varied from a minimum value to a maximum value, in accordance with a series of clock pulses, on the basis of which the vertical transfer of the plurality of image-pixel signals is carried out in each of the first and second sections. The first and second changers correspondingly change the levels of the image-pixel signals, derived from the first and second sections, on the basis of the differential level multiplied by the cyclically-varied weight-factor, such that the regulation of the respective differences between levels of the image-pixel signals in each line derived from the first section, and the corresponding image-pixel signals in each line derived from the second section, is carried out.

In the second aspect of the present invention, the first and second level-changers may comprise a voltage-controlled amplifier, a magnification factor of which is controlled in accordance with a variation of an inputted control voltage, the inputted control voltage being set on the basis of the differential level multiplied by the cyclically-varied weight-factor.

In accordance with a third aspect of the present invention, there is provided an image-pixel signal processor for processing image-pixel signals obtained from an image-sensing area, horizontally divided into a first section and a second section, of a solid-type image sensor, wherein a plurality of image-pixel signals is produced in a matrix on each of the first and second sections. Optionally, the solid-type image sensor may be constructed by combining at least two small-sized solid-type image sensors with each other such that the image-sensing area is formed of a first section and a second section corresponding to image-sensing areas of the small-sized solid-type image sensors, respectively, with a horizontal boundary being defined between the first and second sections. The processor comprises an image-pixel signal reader, which reads respective series of image-pixel signals, from a leading line of the first and second sections of the image-sensing area, by vertically transferring the image-pixel signals in a line by line succession, and by horizontally transferring a vertically-transferred leading line of the image-pixel signals. A leading series of the image-pixel signals, being first to be horizontally transferred from the first and second sections, is farthest from a horizontal boundary between the first and second sections, and a trailing series of the image-pixel signals, being last to be horizontally transferred from the first and second sections, is nearest to the horizontal boundary. The processor also comprises a regulator, which correspondingly regulates respective differences between levels of the image-pixel signals in respective lines derived from the first section, and levels of the image-pixel signals in respective lines derived from the second section, so that a gradual reduction occurs, resulting in the levels of the corresponding trailing-line image-pixel signals, of the first and second sections, being substantially coincident with each other.

In accordance with the third aspect of the present invention, the regulator may comprise a first level-changer for changing a level of each image-pixel signal derived from the first section, a second level-changer for changing a level of each image-pixel signal derived from the second section, a first level-detector for detecting a level of the image-pixel signal outputted from the first level-changer, a second level-detector for detecting a level of the image-pixel signal outputted from the second level-changer, a calculator for calculating a differential level between the levels of the image-pixel signals outputted from the first and second level-changers, and a weight-factor multiplier for multiplying the differential level by a weight-factor, the weight-factor being cyclically varied from a minimum value to a maximum value, in accordance with a series of clock pulses, on the basis of which the horizontal transfer of the plurality of image-pixel signals is carried out for each of the first and second sections. The first and second changers correspondingly change the levels of the image-pixel signals, derived from the first and second sections, on the basis of the differential level multiplied by the cyclically-varied weight-factor, such that the regulation of the respective differences between levels of the image-pixel signals in each line derived from the first section, and the corresponding image-pixel signals in each line derived from the second section, is carried out.

In the third aspect of the present invention, each of the first and second level-changers may comprise a voltage-controlled amplifier, a magnification factor of which is controlled in accordance with a variation of an inputted control voltage, the control voltage being set on the basis of the differential level multiplied by the cyclically-varied weight-factor.

BRIEF DESCRIPTION OF THE DRAWINGS

These objects and other objects of the present invention will be better understood from the following description, with reference to the accompanying drawings, in which.

DESCRIPTION OF THE PREFERRED EMBODIMENTS

Figure 1:
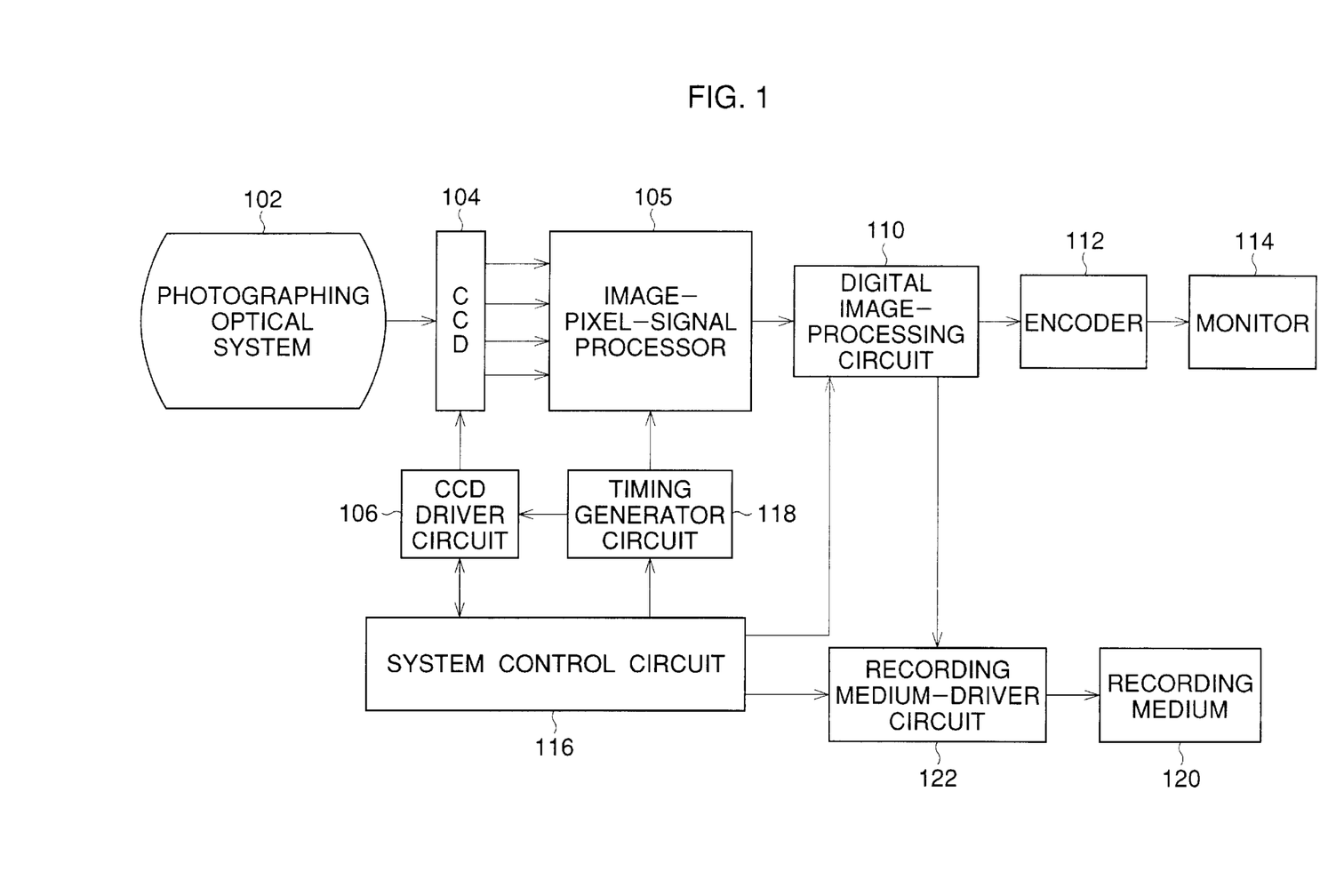
FIG. 1 is a block diagram of an electronic camera having an image-pixel-signal processor according to the present invention.

FIG. 1 shows a block diagram of an electronic camera, in which the present invention is embodied. The electronic camera comprises a photographing optical system 102 which focuses an optical objective-image to be photographed on a CCD (charge-coupled device) image sensor 104, such that the optical objective image is incident and focused on an image-sensing area or light receiving area of the CCD image sensor 104. The optical objective image is photoelectrically converted into a frame of image-pixel signals in the CCD image sensor 104.

The frame of image-pixel signals is successively read from the CCD image sensor 104 by a CCD driver circuit 106, and is then outputted to an image-pixel-signal processor 108, in which the read image-pixel signals are processed in accordance with the present invention, as stated in detail hereinafter.

The electronic camera also comprises a digital image-processing circuit 110, in which the image-pixel signals, processed in the image-pixel-signal processor 108, are converted into digital image-pixel signals, and are then subjected to various image processes, such as shading-correction, gamma correction and so on. The processed digital image-pixel signals are outputted from the digital image-processing circuit 110 into an encoder 112, which produces a video signal on the basis of the processed digital image-pixel signals. The video signal is then fed to an LCD (liquid crystal display) type monitor 114, on which the photographed image is reproduced and observed.

The electronic camera further comprises a system control circuit 116, which may comprise a microcomputer to control the electronic camera as a whole. For example, the system control circuit 116 controls the reading of the image-pixel signals from the CCD image sensor 104, through the CCD driver circuit 106. Also, the system control circuit 116 controls a timing generator circuit 118 for outputting a first series of clock pulses and a second series of clock pulses to both the CCD driver circuit 106 and the image-pixel-signal processor 108. The reading of the image-pixel signals, from the CCD image sensor 104, and the processing of the image-pixel signals, in the image-pixel processor 108, are performed in accordance with the first and second series of clock pulses, outputted from the timing generator circuit 118, as stated in detail hereinafter. Further, the system control circuit 116 controls the digital image-processing circuit 110, which performs the various image processes, as mentioned previously.

The electronic camera is provided with a recording medium 120, such as an IC memory card, a floppy disk and so on, and a recording-medium driver circuit 122 for storing the digital image-pixel signals, outputted from the digital image-processing circuit 110, in the recording medium 120. The memory-medium driver circuit 122 is controlled by the system control circuit 116.

Figure 2:
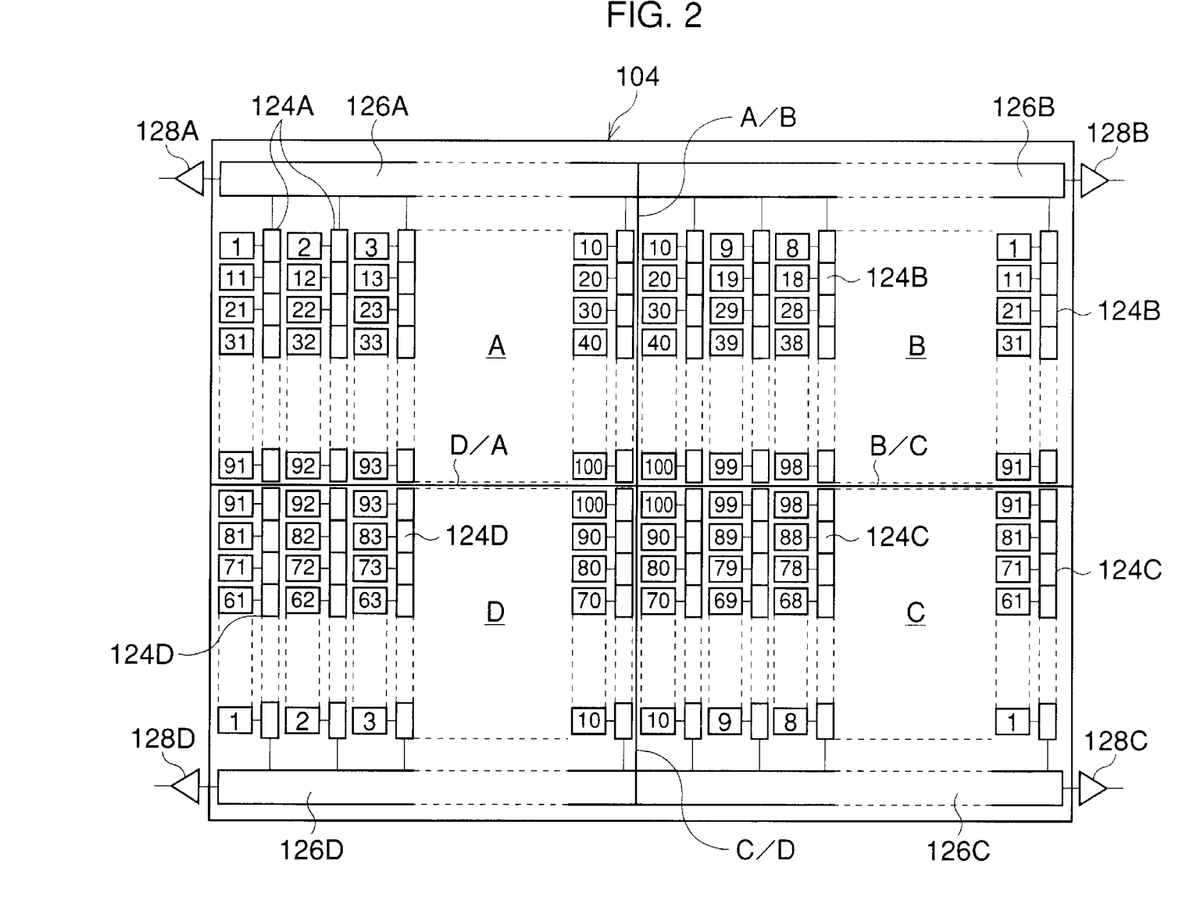
FIG. 2 is a conceptual block diagram of the CCD image sensor shown in FIG. 1.

FIG. 2 conceptually shows an arrangement of the image-sensing area of the CCD image sensor 104. As shown in this drawing, the image-sensing area of the CCD image sensor 104 is divided into four sections A, B, C and D, and respective boundaries between the sections A, B, C and D are indicated by references A/B, B/C, C/D and D/A. In each of the sections A, B, C and D, a hundred CCD elements, numbered 1 through 100, are arranged in a 10×10 matrix; so as to form ten vertical CCD element columns having ten respective CCD elements (1, 11, 21, ~91; 2, 12, 22, ~92; 3, 13, 23, ~93; . . . ; 10, 20, 30,~100), respectively.

Note, although, in reality, a CCD image sensor has a greater number of CCD elements, the CCD elements of the CCD image sensor 104 have been restricted to four hundred, for the sake of convenience of explanation.

Of course, the CCD image sensor 104 may be constructed by combining four small-sized CCD image sensors, each having a small number of CCD elements, so as to be arranged to form the sections A, B, C and D. For example, when each of the small-sized CCD image sensor has 410,000 CCD elements, a total number of CCD elements of the constructed CCD image sensor 104 is 1,640,000, which is equivalent to an actual size required of the CCD image sensor 104 to enable a sufficiently high resolution image to be produced.

Each CCD element includes a photodiode which is arranged so as to form a part of the image-sensing area of the CCD image sensor 104, with each of the CCD elements storing an electric charge produced by the corresponding photodiode in accordance with an amount of incident light. Namely, when the optical objective image is formed and focused on the image-sensing area of the CCD image sensor 104, the respective photodiodes produce electric charges, referred to as image-pixel signals, in accordance with a distribution of the light intensity of the optical objective image. Each of the image-pixel signals is thus stored in the corresponding CCD element.

Also, in each section A, B, C and D, ten vertical-transfer CCD paths (124A, 124B, 124C, 124D) are arranged adjacent to and alternately with the vertical CCD element columns, being connected to respective horizontal-transfer CCD paths (126A, 126B, 126C, 126D). An output terminal of the horizontal-transfer CCD paths (126A, 126B, 126C, 126D) is connected to an amplifier (128A, 128B, 128C, 128D).

Figure 3:
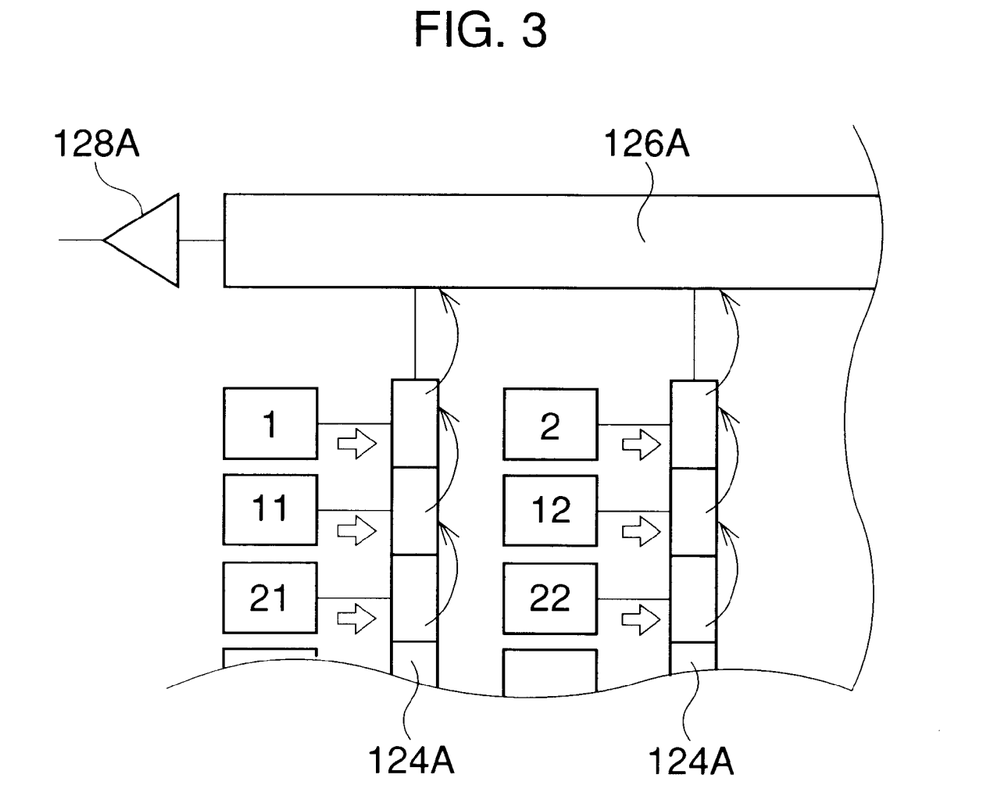
FIG. 3 is an enlargement showing a part of FIG. 2.

At the beginning of the reading of the frame of image-pixel signals from the CCD image sensor 104, in each of the sections A, B, C and D, the ten image-pixel signals, stored in each CCD element column, are shifted to the corresponding vertical-transfer CCD path (124A, 124B, 124C, 124D) under the control of the CCD driver circuit 106, as representatively indicated by open arrows in FIG. 3.

Then, the ten image-pixel signals, shifted from each CCD element column, are successively transferred to the corresponding horizontal-transfer CCD path (126A, 126B, 126C, 126D) along each of the ten vertical-transfer CCD paths (124A, 124B, 124C, 124D), included by each section (A, B, C, D), in accordance with the first series of clock pulses, as representatively indicated by curved arrows in FIG. 3. Namely, whenever one pulse of the first clock pulses is outputted from the timing generator circuit 118 to the CCD driver circuit 106, the horizontal-transfer CCD paths (126A, 126B, 126C, 126D) obtain a horizontal-line of ten image-pixel signals from the corresponding ten vertical-transfer CCD paths (124A, 124B, 124C, 124D), included in each section (A, B, C, 10 D).

The ten image-pixel signals contained in the respective horizontal-transfer CCD paths (126A, 126B, 126C, 126D) are successively transferred to the respective amplifier 128A, 128B, 128C and 128D, in accordance with the second series of clock pulses outputted from the timing generator circuit 118 to the CCD driver circuit 106. Thus, the hundred image-pixel signals are successively read from each of the sections A, B, C and D of the CCD image sensor 104, in ascending numerical order of the numbering of the hundred CCD elements, to the corresponding amplifier (128A, 128B, 128C, 128D). Namely, the four respective sets of the hundred image-pixel signals are simultaneously and correspondingly read in succession from the sections A, B, C and D of the CCD image sensor 104.

Note, of course, in the conceptual example shown in FIGS. 2 and 3, the second series of clock pulses has a frequency ten times that of the first series of clock pulses.

Figure 4:
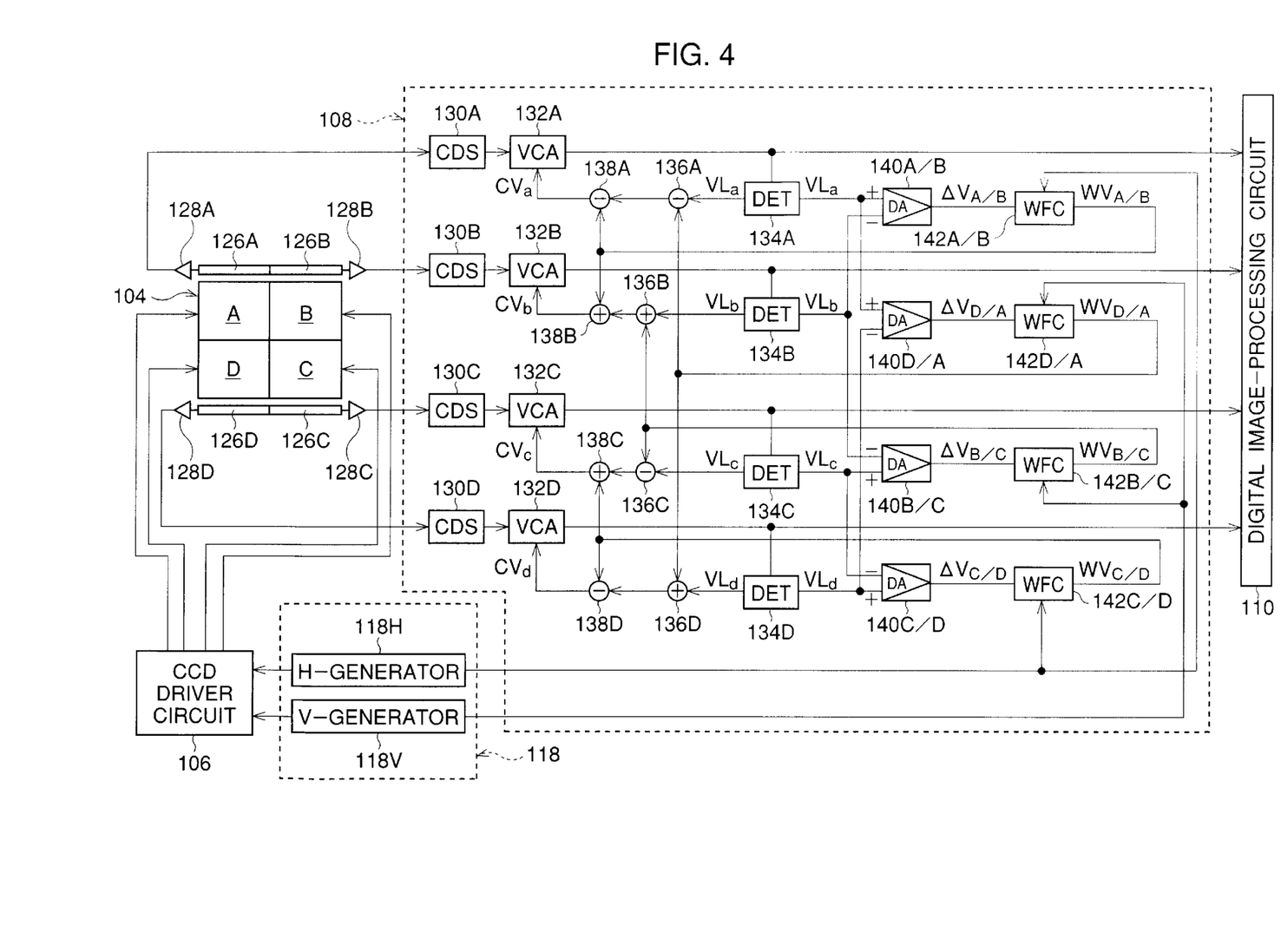
FIG. 4 is a block diagram of the image-pixel-signal processor, together with the CCD image sensor, the CCD driver circuit and the timing generator circuit shown in FIG. 1.

With reference to FIG. 4, a relationship between the CCD image sensor 104, the CCD driver circuit 106, the image-pixel-signal processor 108 and the timing generator circuit 118 is shown in detail as a block diagram.

As shown in FIG. 4, the timing generator circuit 118 includes a vertical-clock-pulse generator 118V, for outputting the first series of clock pulses, and a horizontal-clock-pulse generator 118H, for outputting the second series of clock pulses. While the first and second series of clock pulses are outputted from the generators 118V and 118H to the CCD driver circuit 106, a series of horizontal-transfer-command signals and a series of vertical-transfer-command signals are outputted from the CCD driver circuit 106 to the CCD image sensor 104, in accordance with the first and second series of clock pulses, respectively.

Whenever one of the vertical-transfer-command signals is outputted to the CCD image sensor 104, the successive vertical transfer of the image-pixel signals along the ten respective vertical-transfer CCD paths (124A, 124B, 124C, 124D) is carried out, such that a horizontal-line of ten image-pixel signals is transferred to each horizontal-transfer CCD path (126A, 126B, 126C, 126D). Also, whenever one of the horizontal-transfer-command signals is outputted to the CCD image sensor 104, the horizontal transfer of the image-pixel signals to the respective amplifier (128A, 128B, 128C, 128D) along the horizontal-transfer CCD path (126A, 126B, 126C, 126D) is performed.

As shown in FIG. 4, the image-pixel-signal processor 108 comprises four correlation-double-sampling (CDS) circuits 130A, 130B, 130C and 130D, which are respectively connected to output terminals of the amplifiers 128A, 128B, 128C and 128D of the CCD image sensor 104. While the image-pixel signals, amplified by each of the amplifiers (128A, 128B, 128C, 128D), pass through the corresponding CDS circuit (130A, 130B, 130C and 130D), noise is eliminated from the image-pixel signals.

The CDS circuits 130A, 130B, 130C and 130D are connected, via their output terminals, to four voltage-controlled amplifiers (VCA) 132A, 132B, 132C and 132D, respectively. Each image-pixel signal, passing through the voltage-controlled amplifiers 132A, 132B, 132C and 132D, is amplified by an amplification factor, which is varied in accordance with a magnitude of a control voltage inputted to each voltage-controlled amplifier (132A, 132B, 132C, 132D). Namely, as the magnitude of the control voltage increases, the amplification factor also increases. Note, in FIG. 4, the control voltages, inputted to the voltage-controlled amplifiers 132A, 132B, 132C and 132D, are indicated by references $CV_a$, $CV_b$, $CV_c$ and $CV_d$, respectively. The image-pixel signals, amplified by each voltage-controlled amplifier (132A, 132B, 132C, 132D), are inputted to the digital image-processing circuit 110.

In the digital image-processing circuit 110, the respective image-pixel signals, derived from the sections A, B, C and D of the CCD image sensor 104, are converted into digital image-pixel signals, as mentioned above, and are reintegrated to form a frame of image-pixel signals derived from the combined sections A, B, C and D. After the reintegrated digital image-pixel signals have been subjected to the above-mentioned processes, the reintegrated digital image-pixel signals are successively outputted from the digital image-processing circuit 110 to the encoder 112, in which a video signal is produced on the basis of the processed reintegrated digital image-pixel signals. The video signal is then fed to the LCD-type monitor 114, on which the photographed image is reproduced and observed.

When the photographed image is reproduced on the LCD-type monitor 114, each of the boundaries A/B, B/C, C/D and D/A may appear on the reproduced image, due to a difference of luminous intensity between two image areas of the reproduced image, corresponding to two adjacent sections (A and B; B and C; C and D; and D and A), because an average level of the image-pixel signals, derived from one of the two adjacent sections, may be different from an average level of the image-pixel signals, derived from the other section.

As discussed hereinbefore, although the amplifiers 128A, 128B, 128C and 128D of the CCD image sensor 104 are identical products, each of these amplifiers cannot have precisely identical amplification characteristics. Similarly, with respect to each of the CDS circuits 130A, 130B, 130C and 130D, precisely identical characteristics cannot exist. Also, when the CCD image sensor 104 is constructed by combining the small-sized CCD image sensors with each other, each of the small-sized CCD image sensors cannot have precisely identical characteristics. Accordingly, for example, an average level of the image-pixel signals, derived from section A, is different to an average level of the image-pixel signals, derived from section B, resulting in the appearance of the boundary A/B between the sections A and B on the reproduced image.

Nevertheless, according to the present invention, it is possible to eliminate the appearance of the boundaries A/B, B/C, C/D and D/A from the reproduced image by suitably regulating the respective control voltages $CV_a$, $CV_b$, $CV_c$ and $CV_d$ to be applied to the voltage-controlled amplifiers 132A, 132B, 132C and 132D.

In order to regulate the control voltage $CV_a$, the image-pixel-signal processor 108 is provided with a signal-level detector (DET) 134A, a subtractor 136A and a subtractor 138A, and these elements are arranged as shown in FIG. 4.

In order to regulate the control voltage $CV_b$, the image-pixel-signal processor 108 is provided with a signal-level detector (DET) 134B, an adder 136B and an adder 138B, these elements being arranged as shown in FIG. 4.

In order to regulate the control voltage $CV_c$, the image-pixel-signal processor 108 is provided with a signal-level detector (DET) 134C, a subtractor 136C and an adder 138C, these elements being arranged as shown in FIG. 4.

In order to regulate the control voltage $CV_d$, the image-pixel-signal processor 108 is provided with a signal-level detector (DET) 134D, an adder 136D and a subtractor 138D, these elements being arranged as shown in FIG. 4.

Further, in order to correlatively regulate the control voltages $CV_a$, $CV_b$, $CV_c$ and $CV_d$, the image-pixel-signal processor 108 is provided with four differential amplifiers (DA) 140A/B, 140D/A, 140B/C and 140C/D, and four weight-factor controlling circuits (WFC) 142A/B, 142D/A, 142B/C and 142C/D, and these elements are arranged as in FIG. 4.

The detector 134A detects a voltage level of each of the image-pixel signals, derived from section A of the CCD image sensor 104, and outputs a voltage $VL_a$ representing the detected voltage level; the detector 134B detects a voltage level of the image-pixel signals, derived from section B of the CCD image sensor 104, and outputs a voltage $VL_b$ representing the detected voltage level; the detector 134C detects a voltage level of the image-pixel signals, derived from section C of the CCD image sensor 104, and outputs a voltage $VL_c$ representing the detected voltage level; and the detector 134D detects a voltage level of the image-pixel signals, derived from section D of the CCD image sensor 104, and outputs a voltage $VL_d$ representing the detected voltage level.

Each of the detectors 134A, 134B, 134C and 134D includes an integration circuit such that each of the detected voltages ($VL_a$, $VL_b$, $VL_c$ and $VL_d$) of the respective corresponding image-pixel signals, detected by each detector (134A, 134B, 134C, 134D), is outputted as one value representing an averaged voltage level. Consequently, a high frequency noise component is eliminated from the detected voltage ($VL_a$, $VL_b$, $VL_c$, $VL_d$) by the integration circuit.

The detector 134A has an output terminal connected to a non-inverting input terminal of the differential amplifier 140A/B and a non-inverting input terminal of the differential amplifier 140D/A. Namely, the detected voltage $VL_a$ is inputted to each of the differential amplifiers 140A/B and 140D/A through the non-inverting input terminal thereof.

The detector 134B has an output terminal connected to an inverting input terminal of the differential amplifier 140A/B and an inverting input terminal of the differential amplifier 140B/C. Namely, the detected voltage $VL_b$ is inputted to each of the differential amplifiers 140A/B and 140B/C through the inverting input terminal thereof.

The detector 134C has an output terminal connected to a non-inverting input terminal of the differential amplifier 140B/C and an inverting input terminal of the differential amplifier 140C/D. Namely, the detected voltage $VL_c$ is inputted to the differential amplifier 140B/C through the non-inverting input terminal thereof, and is simultaneously inputted to the differential amplifier 140C/D through the inverting input terminal thereof.

The detector 134D has an output terminal connected to an inverting input terminal of the differential amplifier 140D/A and a non-inverting input terminal of the differential amplifier 140C/D. Namely, the detected voltage $VL_d$ is inputted to the differential amplifier 140D/A through the inverting input terminal thereof, and is simultaneously inputted to the differential amplifier 140C/D through the non-inverting input terminal thereof.

The differential amplifier 140A/B outputs a differential voltage $\Delta V_{A/B}$, generated from the detected voltages $VL_a$ and $VL_b$, to the weight-factor controlling circuit 142A/B. The differential voltage $\Delta V_{A/B}$ represents a differential signal-level between an image-pixel signal derived from section A and a corresponding image-pixel signal derived from section B. In this case, if the detected voltage $VL_a$ is larger than the detected voltage $VL_b$, the differential voltage $\Delta V_{A/B}$ is positive, and, if the detected voltage $VL_a$ is smaller than the detected voltage $VL_b$, the differential voltage $\Delta V_{A/B}$ is negative.

The differential amplifier 140D/A outputs a differential voltage $\Delta V_{D/A}$, generated from the detected voltages $VL_d$ and $VL_a$, to the weight-factor controlling circuit 142D/A. The differential voltage $\Delta V_{D/A}$ represents a differential signal-level between an image-pixel signal derived from section D and a corresponding image-pixel signal derived from section A. In this case, if the detected voltage $VL_d$ is smaller than the detected voltage $VL_a$, the differential voltage $\Delta V_{D/A}$ is positive, and, if the detected voltage $VL_d$ is larger than the detected voltage $VL_a$, the differential voltage $\Delta V_{D/A}$ is negative.

The differential amplifier 140B/C outputs a differential voltage $\Delta V_{B/C}$, generated from the detected voltages $VL_b$ and $VL_c$, to the weight-factor controlling circuit 142B/C. The differential voltage $\Delta V_{B/C}$ represents a differential signal-level between an image-pixel signal derived from section B and a corresponding image-pixel signal derived from section C. In this case, if the detected voltage $VL_b$ is smaller than the detected voltage $VL_c$, the differential voltage $\Delta V_{B/C}$ is positive, and, if the detected voltage $VL_b$ is larger than the detected voltage $VL_c$, the differential voltage $\Delta V_{B/C}$ is negative.

The differential amplifier 140C/D outputs a differential voltage $\Delta V_{C/D}$, generated from the detected voltages $VL_c$ and $VL_d$, to the weight-factor controlling circuit 142C/D. The differential voltage $\Delta V_{C/D}$ represents a differential signal-level between an image-pixel signal derived from section C and a corresponding image-pixel signal derived from section D. In this case, if the detected voltage $VL_c$ is smaller than the detected voltage $VL_d$, the differential voltage $\Delta V_{C/D}$ is positive, and, if the detected voltage $VL_c$ is larger than the detected voltage $VL_d$, the differential voltage $\Delta V_{C/D}$ is negative.

Figure 5:
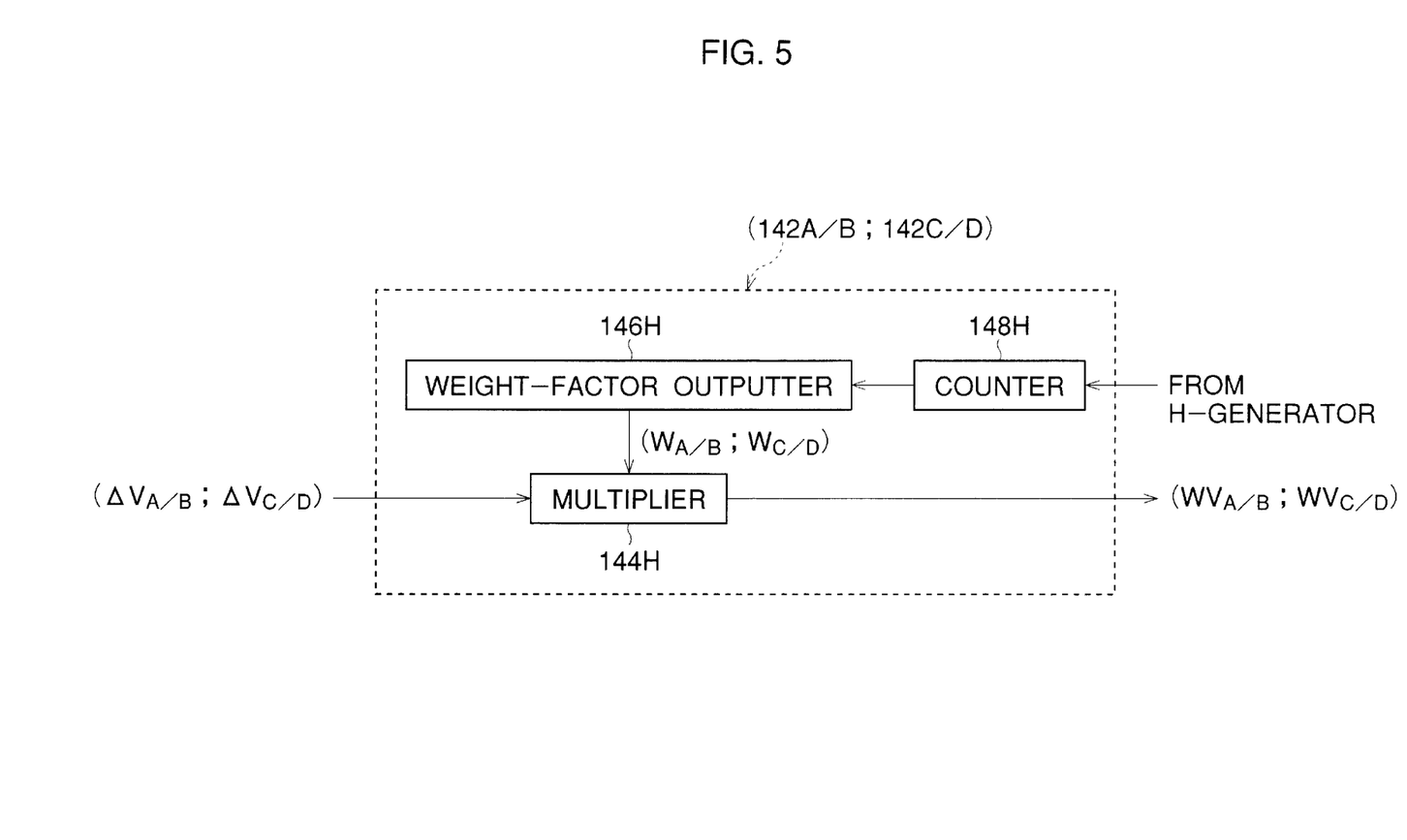
FIG. 5 is a block diagram of a weight-factor controlling circuit shown in FIG. 4.

As shown in FIG. 5, the weight-factor controlling circuit, indicated by references 142A/B and 142C/D, includes a multiplier 144H, a weight-factor outputter 146H and a counter 148H. The differential voltage ($\Delta V_{A/B}$, $\Delta V_{C/D}$) is inputted to the multiplier 144H, and is multiplied by a weight-factor or multiplying factor ($W_{A/B}$, $W_{C/D}$), which is outputted as a voltage signal from the weight-factor outputter 146H to the multiplier 144H. The voltage signal ($W_{A/B}$, $W_{C/D}$), representing the weight-factor, is cyclically varied by the counter 148H.

Figure 6:
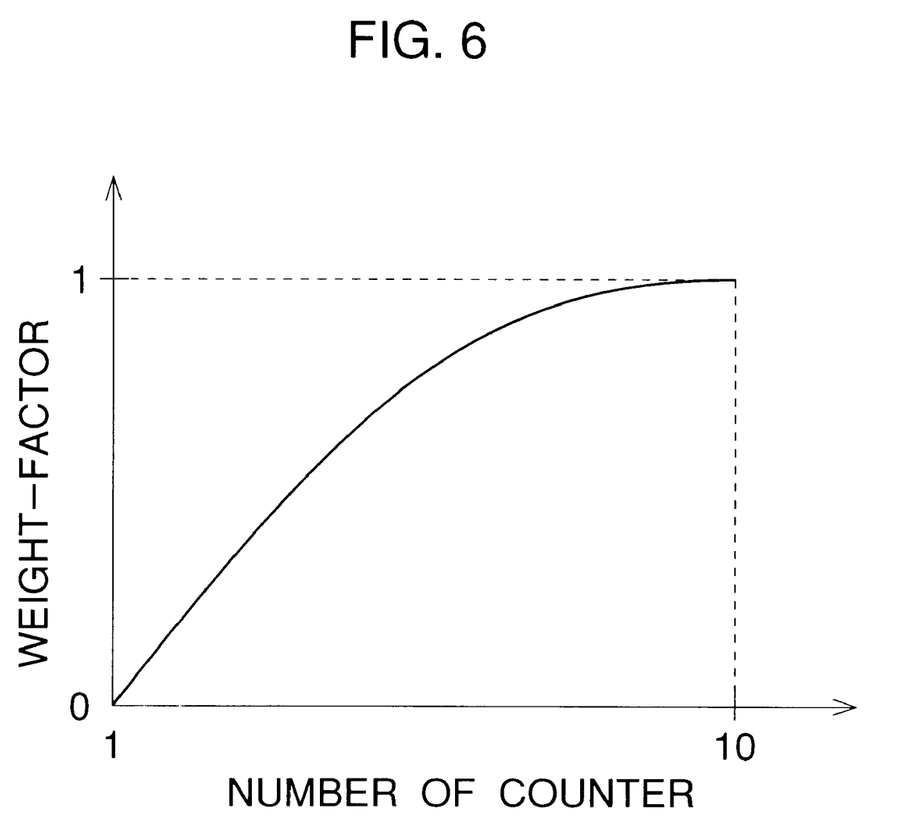
FIG. 6 is a graph showing a characteristic curve of a weight-factor used in the weight-factor multiplier of the image-pixel-signal processor shown in FIG. 5.

Specifically, the counter 148H counts a number of the second clock pulses outputted from the horizontal-clockpulse generator 118H of the timing generator circuit 118, and is reset to zero whenever it counts ten clock pulses. Also, whenever the counter number of the counter 148H is incremented by "1", the counter 148H outputs a weight-factor-outputting-command signal to the weight-factor outputter 146H. Whenever the weight-factor-outputting-command signal is outputted to the weight-factor outputter 146H during the counting of the ten clock pulses by the counter 148H, the weight-factor, i.e. the voltage signal ($W_{A/B}$, $W_{C/D}$), outputted from the weight-factor-outputter 146H to the multiplier 144H, is gradually increased in accordance with a characteristic curve, as shown in FIG. 6. As is apparent from this graph, when the number of the counter 148H is one, the weight-factor ($W_{A/B}$, $W_{C/D}$) is zero, and, when the number of the counter 148H is ten, the weight-factor ($W_{A/B}$, $W_{C/D}$) one.

Namely, for example, the ten respective differential voltages $\Delta V_{A/B}$, derived from both the ten detected voltages $VL_a$, generated from a horizontal-line of the CCD elements in section A, and the ten detected voltages $VL_b$, generated from a corresponding horizontal-line of the CCD elements in section B, are multiplied by the weight-factors $W_{A/B}$, which are gradually incremented in accordance with the characteristic curve of FIG. 6. Similarly, this is true for the ten respective differential voltages $\Delta V_{C/D}$, derived from both the ten detected voltages $VL_c$, generated from a horizontal-line of the CCD elements in section C, and the ten detected voltages $VL_d$, generated from a corresponding horizontal-line of the CCD elements in section D. In short, each of the above-mentioned ten differential voltages $\Delta V_{C/D}$, multiplied by the varying weight-factors $W_{C/D}$, is outputted as a weighted voltage $WV_{C/D}$ from the multiplier 144H.

Figure 7:
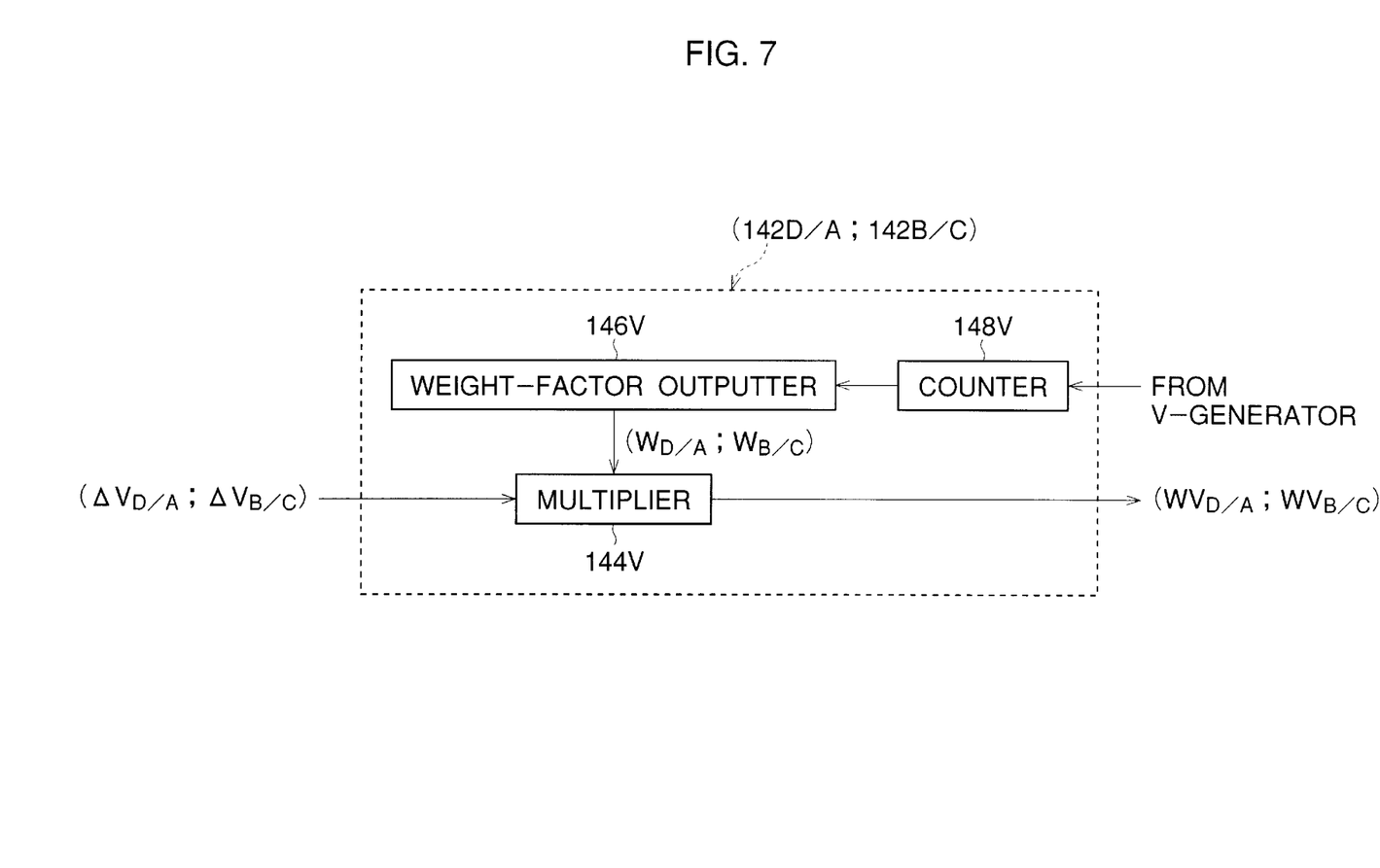
FIG. 7 is a block diagram of another weight-factor controlling circuit shown in FIG. 4.

As shown in FIG. 7, the weight-factor controlling circuit, indicated by references 142D/A and 142B/C, includes a multiplier 144V, a weight-factor outputter 146V and a counter 148V. The differential voltage ($\Delta V_{D/A}$, $\Delta V_{B/C}$) is inputted to the multiplier 144V, and is multiplied by a weight-factor or multiplying factor ($W_{D/A}$, $W_{B/C}$), which is outputted as a voltage signal from the weight-factor outputter 146V to the multiplier 144V. The voltage signal ($W_{D/A}$, $W_{B/C}$), representing the weight-factor, is cyclically varied by the counter 148V.

Specifically, the counter 148V counts a number of the first clock pulses outputted from the vertical-clock-pulse generator 118V of the timing generator circuit 118, and is reset to zero whenever it counts ten clock pulses. Also, whenever the counter number of the counter 148V is incremented by "1", the counter 148V outputs a weight-factor-outputting-command signal to the weight-factor outputter 146V. Whenever the weight-factor-outputting-command signal is outputted to the weight-factor outputter 146V during the counting of the ten clock pulses by the counter 148V, the weight-factor, i.e. the voltage signal ($W_{D/A}$, $W_{B/C}$), outputted from the weight-factor-outputter 146V to the multiplier 144V, is gradually increased in accordance with the characteristic curve shown in FIG. 6. Of course, when the number of the counter 148V is one, the weight-factor ($W_{D/A}$, $W_{B/C}$) is zero, and, when the number of the counter 148V is ten, the weight-factor ($W_{D/A}$, $W_{B/C}$) is one.

Namely, for example, the ten respective differential voltages $\Delta V_{D/A}$, derived from both the ten detected voltages $VL_d$, generated from a horizontal-line of the CCD elements in section D, and the ten detected voltages $VL_a$, generated from a corresponding horizontal-line of the CCD elements in section A, are multiplied by an identical weight-factor $W_{D/A}$ determined by a counter number of the counter 148V, due to the frequency of the first clock pulses being one-tenth of the second clock pulses outputted from the horizontal-clock-pulse generator 118H. The weight-factor is gradually incremented, whenever the multiplication of the above-mentioned ten differential voltages $\Delta V_{D/A}$ by the weight-factor $W_{D/A}$ is performed. Similarly, this is true for the ten respective differential voltages $\Delta V_{B/C}$, derived from both the ten detected voltages $VL_b$, generated from a horizontal-line in the section B, and the ten detected voltages $VL_c$, generated from a corresponding horizontal-line of the CCD elements in section C. In short, each of the differential voltages $\Delta V_{B/C}$, multiplied by the weight-factor $W_{B/C}$, is outputted as a weighted voltage $WV_{B/C}$ from the multiplier 144V.

As is apparent from FIG. 4, the weighted voltage $WV_{A/B}$, outputted from the weight-factor controlling circuit 142A/B, is inputted to the subtractor 138A and the adder 138B, and the weighted voltage $WV_{C/D}$, outputted from the weight-factor controlling circuit 142C/D, is inputted to the adder 138C and the subtractor 138D. Also, the weighted voltage $WV_{D/A}$, outputted from the weight-factor controlling circuit 142D/A, is inputted to the adder 136D and the subtractor 136A, and the weighted voltage $WV_{B/C}$, outputted from the weight-factor controlling circuit 142B/C, is inputted to the adder 136B and the subtractor 136C.

With the arrangement as mentioned, the control voltages $CV_a$, $CV_b$, $CV_c$ and $CV_d$ to be applied to the voltage-controlled amplifiers 132A, 132B, 132C and 132D, respectively, are suitably regulated, so that the appearance of the boundaries A/B, B/C, C/D and D/A can be eliminated from the reproduced image.

For example, as shown in FIG. 4, when the voltage $VL_a$, detected by the detector 134A, is outputted to the differential amplifier 140D/A, the voltage $VL_a$ is simultaneously outputted to the subtractor 136A. Therefore, in the subtractor 136A, the corresponding weighted voltage $WV_{D/A}$, outputted from the weight-factor controlling circuit 142D/A, is subtracted from the voltage $VL_a$. On the other hand, when the voltage $VL_d$, detected by the detector 134D, is outputted to the differential amplifier 140D/A, the voltage $VL_d$ is simultaneously outputted to the adder 136D. Therefore, in the adder 136D, the corresponding weighted voltage $WV_{D/A}$, outputted from the weight-factor controlling circuit 142D/A, is added to the voltage $VL_d$.

If $VL_a > VL_d$, the weighted voltage $WV_{D/A}$, outputted from the weight-factor controlling circuit 142D/A, is positive. Accordingly, the level of the voltage $VL_a$ is decreased due to the inputting of the positive weighted voltage $WV_{D/A}$ to the subtractor 136A, whereas the level of the voltage $VL_d$ is correspondingly increased due to the inputting of the positive weighted voltage $WV_{D/A}$ to the adder 136D. The decreased voltage $VL_a$ is inputted as the control voltage $CV_a$ to the voltage-controlled amplifier 132A, and thus the magnification factor of the voltage-controlled amplifier 132A is lowered, whereby a level of the image-pixel signal becomes smaller. On the other hand, the increased voltage $VL_d$ is inputted as the control voltage $CV_d$ to the voltage-controlled amplifier 132D, and thus the magnification factor of the voltage-controlled amplifier 132D is raised, whereby a level of the image-pixel signal becomes larger.

On the contrary, if $VL_a < VL_d$, the weighted voltage $WV_{D/A}$, outputted from the weight-factor controlling circuit 142D/A, is negative. Accordingly, the level of the detected voltage $VL_a$ is increased due to the inputting of the negative weighted voltage $WV_{D/A}$ to the subtractor 136A, whereas the level of the voltage $VL_d$ is correspondingly decreased due to the inputting of the negative weighted voltage $WV_{D/A}$ to the adder 136D. The increased voltage $VL_a$ is inputted as the control voltage $CV_a$ to the voltage-controlled amplifier 132A, and thus the magnification factor of the voltage-controlled amplifier 132A is raised, whereby a level of the image-pixel signal becomes larger. On the other hand, the decreased voltage $VL_d$ is inputted as the control voltage $CV_d$ to the voltage-controlled amplifier 132D, and thus the magnification factor of the voltage-controlled amplifier 132D is lowered, whereby a level of the image-pixel signal becomes smaller.

Nevertheless, the regulation of the control voltages $CV_a$ and $CV_d$ is substantially equivalent with respect to both the ten image-pixel signals, included in a horizontal-line of the CCD elements in section A, and the ten image-pixel signals, included in a corresponding horizontal-line of the CCD elements is section D, because the generated ten differential voltages $\Delta V_{D/A}$, as described previously, are multiplied by identical weight-factors.

More significantly, the regulation of the control voltages $CV_a$ and $CV_d$ becomes increasingly critical as the weight-factor approches one. Namely, a difference in level between an image-pixel signal, derived from section A, and a corresponding image-pixel signal, derived from section D, approches zero, as both the image-pixel signals near the boundary D/A between the sections D and A. Thus, a difference in level between the ten image-pixel signals, derived from the CCD elements numbered 91, 92, 93, ~, 98, 99 and 100 in section D, and the ten image-pixel signals, derived from the CCD elements numbered 91, 92, 93, ~, 98, 99 and 100 in section A, substantially becomes zero, because the regulation of the control voltages $CV_a$ and $CV_d$ is performed with a weighted voltage $WV_{D/A}$ derived from a weight-factor of "1". Namely, the boundary D/A between the sections D and A cannot appear on the reproduced image.

In short, the respective control voltages $CV_a$ and $CV_d$ can be represented by the following formulas:

$$CV_a = VL_a - W_{D/A} * \Delta V_{D/A}$$
$$= VL_a - W_{D/A}(VL_a - VL_d)$$
$$= (1 - W_{D/A})VL_a + W_{D/A} * VL_d$$

$$CV_d = VL_d + W_{D/A} * \Delta V_{D/A}$$
$$= Vl_a + W_{D/A}(VL_a - VL_d)$$
$$= (1 - W_{D/A})VL_d + W_{D/A} * VL_d$$

Herein: $0 \leq W_{D/A} \leq 1$

Of course, this is also true for a relationship between the image-pixel signals in section B and the image-pixel signals in section C. Namely, the respective control voltages $CV_b$ and $CV_c$ can be represented by the following formulas:

$$CV_b = VL_b + W_{B/C} * \Delta V_{B/C}$$
$$= VL_b + W_{B/C}(VL_c - VL_b)$$
$$= (1 - W_{B/C})VL_b + W_{B/C} * VL_c$$

$$CV_c = VL_c - W_{B/C} * \Delta V_{B/C}$$
$$= Vl_c - W_{B/C}(VL_c - VL_b)$$
$$= (1 - W_{B/C})VL_c + W_{B/C} * VL_b$$

Herein: $0 \leq W_{B/C} \leq 1$

Also, as shown in FIG. 4, when the voltage $VL_a$ detected by the detector 134A, is outputted to the differential amplifier 140A/B, the voltage $VL_a$ is simultaneously outputted to the subtractor 138A. Therefore, in the subtractor 138A, the corresponding weighted voltage $WV_{A/B}$, outputted from the weight-factor controlling circuit 142A/B, is subtracted from the voltage $VL_a$. On the other hand, when the voltage $VL_b$, detected by the detector 134B, is outputted to the differential amplifier 140A/B, the voltage $VL_b$ is simultaneously outputted to the adder 138B. Therefore, in the adder 138B, the corresponding weighted voltage $WV_{A/B}$, outputted from the weight-factor controlling circuit 142A/B, is added to the voltage $VL_b$.

If $VL_a > VL_b$, the weighted voltage $WV_{A/B}$, outputted from the weight-factor controlling circuit 142A/B, is positive. Accordingly, the level of the voltage $VL_a$ is decreased due to the inputting of the positive weighted voltage $WV_{A/B}$ to the subtractor 138A, whereas the level of the voltage $VL_b$ is correspondingly increased due to the inputting of the positive weighted voltage $WV_{A/B}$ to the adder 138B. The decreased voltage $VL_a$ is inputted as the control voltage $CV_a$ to the voltage-controlled amplifier 132A, and thus the magnification factor of the voltage-controlled amplifier 132A is lowered, whereby a level of the image-pixel signal becomes smaller. On the other hand, the increased voltage $VL_b$ is inputted as the control voltage $CV_b$ to the voltage-controlled amplifier 132B, and thus the magnification factor of the voltage-controlled amplifier 132B is raised, whereby a level of the image-pixel signal becomes larger.

On the contrary, if $VL_a < VL_b$, the weighted voltage $WV_{A/B}$, outputted from the weight-factor controlling circuit 142A/B, is negative. Accordingly, the level of the detected voltage $VL_a$ is increased due to the inputting of the negative weighted voltage $WV_{A/B}$ to the subtractor 138A, whereas the level of the voltage $VL_b$ is correspondingly decreased due to the inputting of the negative weighted voltage $WV_{A/B}$ to the adder 138B. The increased voltage $VL_a$ is inputted as the control voltage $CV_a$ to the voltage-controlled amplifier 132A, and thus the magnification factor of the voltage-controlled amplifier 132A is raised, whereby a level of the image-pixel signal becomes larger. On the other hand, the decreased voltage $VL_b$ is inputted as the control voltage $CV_b$ to the voltage-controlled amplifier 132B, and thus the magnification factor of the voltage-controlled amplifier 132D is lowered, whereby a level of the image-pixel signal becomes smaller.

Accordingly, a difference in level between an image-pixel signal, derived from section A, and a corresponding image-pixel signal, derived from section B, approaches zero, as both the image-pixel signals near the boundary A/B between the sections A and B. Thus, a difference in level between the ten image-pixel signals, derived from the CCD elements numbered 10, 20, 30,~, 80, 90 and 100 in section A, and the ten image-pixel signals, derived from the CCD elements numbered 10, 20, 30,~, 80, 90 and 100 in section B, substantially becomes zero, because the regulation of the control voltages $CV_a$ and $CV_b$ is performed with a weighted voltage $WV_{A/B}$ derived from a weight-factor of "1". Namely, the boundary A/B between the sections A and B cannot appear on the reproduced image.

In short, the respective control voltages $CV_a$ and $CV_b$ can be represented by the following formulas:

$$CV_a = VL_a - W_{A/B} * \Delta V_{A/B}$$
$$= VL_a - W_{A/B}(VL_a - VL_b)$$
$$= (1 - W_{A/B})VL_a + W_{D/A} * VL_b$$

$$CV_b = VL_b + W_{A/B} * \Delta V_{A/B}$$
$$= VL_b + W_{A/B}(VL_a - VL_b)$$
$$= (1 - W_{A/B})VL_b + W_{A/B} * VL_a$$

Herein: $0 \leq W_{A/B} \leq 1$

Of course, this is also true for a relationship between the image-pixel signals in section C and the image-pixel signals in section D. Namely, the respective control voltages $CV_c$ and $CV_d$ can be represented by the following formulas:

$$CV_c = VL_c + W_{C/D} * \Delta V_{C/B}$$
$$= VL_c + W_{C/D}(VL_d - VL_C)$$
$$= (1 - W_{C/D})VL_c + W_{C/D} * VL_d$$

$$CV_d = VL_d - W_{C/D} * \Delta V_{C/D}$$
$$= VL_d - W_{C/D}(VL_d - VL_c)$$
$$= (1 - W_{C/D})VL_d + W_{C/D} * VL_c$$

Herein: $0 \leq W_{C/D} \leq 1$

Finally, it will be understood by those skilled in the art that the foregoing description is of preferred embodiments of the device, and that various changes and modifications may be made to the present invention without departing from the spirit and scope thereof.

The present disclosure relates to subject matter contained in Japanese Patent Application No. 9-102750 (filed on Apr. 4, 1997) which is expressly incorporated herein, by reference, in its entirety.

What is claimed is:

1. An image-pixel signal processor that processes image-pixel signals obtained from an image-sensing area, which is divided into a first section and a second section, of a solid-type image sensor, said signal processor comprising:

an image-pixel signal reader that simultaneously and correspondingly reads two respective series of image-pixel signals line by line from said first section and said second section of said image-sensing area, a leading image-pixel signal of the image-pixel signals included in each line being farthest away from a boundary between said first section and said second section, a trailing image-pixel signal of the image-pixel signals included in each line being nearest to said boundary; and a regulator that correspondingly regulates respective differences between levels of the image-pixel signals in each line, derived from said first section, and corresponding image-pixel signals in each line, derived from said second section, so that a gradual reduction occurs, resulting in both levels of the trailing image-pixel signals, derived from said first section and said second section, being substantially coincident with each other, wherein said regulator comprises:

a first level-changer that changes a level of each image-pixel signal derived from said first section;

a second level-changer that changes a level of each image-pixel signal derived from said second section;

a first level-detector that detects a level of the image-pixel-signal outputted from said first level-changer;

a second level-detector that detects a level of the image-pixel signal outputted from said second level-changer;

a calculator that calculates a differential level between the levels of the image-pixel signals outputted from said first level-changer and said second level-changer; and a weight-factor multiplier that multiplies the differential level by a weight-factor, which is cyclically varied from a minimum value to a maximum value, wherein said first level-changer and said second level-changer correspondingly change the levels of the image-pixel signals derived from said first and second sections on the basis of the differential level multiplied by the cyclically-varied weight-factor, such that the regulation of said respective differences between levels of the image-pixel signals in each line, derived from said first section, and the corresponding image-pixel signals in each line, derived from said second section, is carried out.

2. An image-pixel signal processor as set forth in claim 1, wherein said first level-changer and said second level-changer comprise a first voltage-controlled amplifier and a second voltage-controlled amplifier, and a magnification factor of each voltage-controlled amplifier is controlled in accordance with a variation of an inputted control voltage, the inputted control voltage being set on the basis of the differential level multiplied by the cyclically-varied weight-factor.

3. The image-pixel signal processor of claim 2, wherein said first level detector outputs a voltage signal ($V_{1st}$) as the detected level of the image-pixel signal derived from said first section, said second level detector outputs a voltage signal ($V_{2nd}$) as the detected level of the image-pixel signal derived from said second section, and said calculator outputs a voltage signal ($V_{1st}-V_{2nd}$) as the differential level between the levels of the voltage signals outputted from said first level-changer and said second level- changer, respective control voltages ($VC_{1st}$ and $VC_{2nd}$) of said first voltage-controlled amplifier and said second voltage-controlled amplifier being defined as follows:

$$VC_{1st}=(1-WF)V_{1st}+WF*V_{2nd}$$
$$VC_{2nd}=(1-WF)V_{2nd}+WF*V_{1st}$$

where WF represents the weight-factor ($0 \leq WF \leq 1$).

4. An image-pixel signal processor that processes image-pixel signals obtained from an image-sensing area, vertically divided into a first section and a second section, of a solid-type image sensor, a plurality of image-pixel signals being produced in a matrix arrangement on each of said first section and said second section, said signal processor comprising:

an image-pixel signal reader that reads respective series of image-pixel signals, from a leading line of said first section and said second section, by vertically transferring said plurality of image-pixel signals in a line by line succession, and by horizontally transferring a vertically-transferred leading line of said plurality of image-pixel signals, a leading image-pixel signal of the image-pixel signals included in each line being farthest from a vertical boundary between said first section and said second section, a trailing image-pixel signal of the image-pixel signals included in each line being nearest to said vertical boundary; and a regulator that correspondingly regulates respective differences between levels of the image-pixel signals in each line, derived from said first section, and the corresponding image-pixel signals in each line, derived from said second section, so that a gradual reduction occurs, resulting in both levels of the trailing image-pixel signals, derived from said first and second sections, being substantially coincident with each other, wherein said regulator comprises:

a first level-changer that changes a level of each image-pixel signal derived from said first section;

a second level-changer that changes a level of each image-pixel signal derived from said second section;

a first level-detector that detects a level of the image-pixel signal outputted from said first level-changer;

a second level-detector that detects a level of the image-pixel signal outputted from said second level-changer;

a calculator that calculates a differential level between the levels of the image-pixel signals outputted from said first level-changer and said second level-changer; and a weight-factor multiplier multiplying the differential level by a weight-factor, said weight-factor being cyclically varied from a minimum value to a maximum value in accordance with a series of clock pulses, on the basis of which the vertical transfer of the plurality of image-pixel signals is carried out in each of said first section and said second section, wherein said first level-changer and said second level-changer correspondingly change the levels of the image-pixel signals derived from said first section and said second section on the basis of the differential level multiplied by the cyclically-varied weight-factor, such that the regulation of said respective differences between levels of the image-pixel signals in each line, derived from said first section, and the corresponding image-pixel signals in each line, derived from said second section, is carried out.

5. An image-pixel signal processor as set forth in claim 4, wherein said first level-changer and said second level-changer comprise a first voltage-controlled amplifier and a second voltage-controlled amplifier, and a magnification factor of each voltage-controlled amplifier is controlled in accordance with a variation of an inputted control voltage, the inputted control voltage being set on the basis of the differential level multiplied by the cyclically-varied weight-factor.

6. The image-pixel signal processor of claim 5, wherein said first level detector outputs a voltage signal ($V_{1st}$) as the detected level of the image-pixel signal derived from said first section, said second level detector outputs a voltage signal ($V_{2nd}$) as the detected level of the image-pixel signal derived from said second section, and said calculator outputs a voltage signal ($V_{1st}-V_{2nd}$) as the differential level between the levels of the voltage signals outputted from said first level-changer and said second level-changer, the respective control voltages ($VC_{1st}$ and $VC_{2nd}$) of said first voltage-controlled amplifier and said second voltage-controlled amplifier being defined as follows:

$$VC_{1st}=(1-WF)V_{1st}+WF*V_{2nd}$$

$$VC_{2nd}=(1-WF)V_{2nd}+WF*V_{1st}$$

where WF represents the weight-factor ($0 \leq WF \leq 1$).

7. An image-pixel signal processor that processes image-pixel signals obtained from an image-sensing area, horizontally divided into a first section and a second section, of a solid-type image sensor, a plurality of image-pixel signals being produced in a matrix arrangement on each o said first section and said second section, said signal processor comprising:

an image-pixel signal reader that reads respective series of image-pixel signals, from a leading line of said first section and said second section, by vertically transferring said plurality of image-pixel signals in a line by line succession, and by horizontally transferring a vertically transferred leading line of said plurality of image-pixel signals, a leading series of said plurality of image-pixel signals, first to be horizontally transferred from said first section and said second section, being farthest from a horizontal boundary between said first section and said second section, a trailing series of said plurality of image-pixel signals, last to be horizontally transferred from said first second section and said second section, being nearest to said horizontal boundary; and a regulator that correspondingly regulates respective differences between levels, represented by the image-pixel signals in respective lines, derived from said first section, and corresponding levels, represented by the image-pixel signals in respective lines, derived from said second section, so that a gradual reduction occurs, resulting in both levels, represented by the image-pixel signals in the trailing lines of said first section and said second section, being substantially coincident with each other, wherein said regulator comprises:

a first level-changer that changes a level of each image-pixel signal derived from said first section;

a second level-changer that changes a level of each image-pixel signal derived from said second section;

a first level-detector that detects a level of the image-pixel signal outputted from said first level-changer;

a second level-detector that detects a level of the image-pixel signal outputted from said second level-changer;

a calculator that calculates a differential level between the levels of the image-pixel signals outputted from said first level-changer and said second level-changer; and a weight-factor multiplier that multiplies the differential level by a weight-factor, said weight-factor being cyclically varied from a minimum value to a maximum value in accordance with a series of clock pulses, on the basis of which the horizontal transfer of the plurality of image-pixel signals is carried out in each of said first section and said second section, wherein said first level-changer and said second level-changer correspondingly change the levels of the image-pixel signals derived from said first and second sections on the basis of the differential level multiplied by the cyclically-varied weight-factor, such that the regulation of said respective differences between levels of the image-pixel signals in each line, derived from said first section, and the corresponding image-pixel signals in each line, derived from said second section, is carried out.

8. An image-pixel signal processor as set forth in claim 7, wherein said first level-changer and said second level-changer comprise a first voltage-controlled amplifier and a second voltage-controlled amplifier, and a magnification factor of each voltage-controlled amplifier is controlled in accordance with a variation of an inputted control voltage, the inputted control voltage being set on the basis of the differential level multiplied by the cyclically-varied weight-factor.

9. The image-pixel signal processor of claim 8, wherein said first level detector outputs a voltage signal ($V_{1st}$) as the detected level of the image-pixel signal derived from said first section, said second level detector outputs a voltage signal ($V_{2nd}$) as the detected level of the image-pixel signal derived from said second section, and said calculator outputs a voltage signal ($V_{1st}-V_{2nd}$) as the differential level between the levels of the voltage signals outputted from said first level-changer and said second level-changer, respective control voltages ($VC_{1st}$ and $VC_{2nd}$) of said first voltage-controlled amplifier and said second voltage-controlled amplifier being defined as follows:

$$VC_{1st}=(1-WF)V_{1st}+WF*V_{2nd}$$

$$VC_{2nd}=(1-WF)V_{2nd}+WF*V_{1st}$$

where WF represents the weight-factor ($0 \leq WF \leq 1$).

10. An image-pixel signal processor that processes image-pixel signals obtained from an image-sensing area of a solid-type image sensor, which is constructed by combining at least two small-sized solid-type image sensors with each other such that said image-sensing area is formed of a first section and a second section corresponding to image-sensing areas of said small-sized solid-type image sensors, respectively, said signal processor comprising:

an image-pixel signal reader that simultaneously and correspondingly reads two respective series of image-pixel signals line by line from said first section and said second section of said image-sensing area, a leading image-pixel signal of the image-pixel signals included in each line being farthest away from a boundary between said first section and said second section, a trailing image-pixel signal of the image-pixel signals included in each line being nearest to said boundary and a regulator correspondingly regulating respective differences between levels of the image-pixel signals in each line, derived from said first section, and the corresponding image-pixel signals in each line, derived from said second section, so that a gradual reduction occurs, resulting in both levels of the trailing image-pixel signals, derived from said first section and said second section, being substantially coincident with each other, wherein said regulator comprises:

a first level-changer that changes a level of each image-pixel signal derived from said first section;

a second level-changer that changes a level of each image-pixel signal derived from said second section;

a first level-detector that detects a level of the image-pixel signal outputted from said first level-changer;

a second level-detector that detects a level of the image-pixel signal outputted from said second level-changer;

a calculator that calculates a differential level between the levels of the image-pixel signals outputted from said first level-changer and said second level-changer; and a weight-factor multiplier that multiplies the differential level by a weight-factor, which is cyclically varied from a minimum value to a maximum value, wherein said first level-changer and said second level-changer correspondingly change the levels of the image-pixel signals derived from said first section and said second section on the basis of the differential level multiplied by the cyclically-varied weight-factor, such that the regulation of said respective differences between levels of the image-pixel signals in each line, derived from said first section, and the corresponding image-pixel signals in each line, derived from said second section, is carried out.

11. An image-pixel signal processor as set forth in claim 10, wherein said first level-changer and said second level-changer comprise a first voltage-controlled amplifier and a second voltage-controlled amplifier, and a magnification factor of each voltage-controlled amplifier is controlled in accordance with a variation of an inputted control voltage, the inputted control voltage being set on the basis of the differential level multiplied by the cyclically-varied weight-factor.

12. The image-pixel signal processor of claim 11, wherein said first level detector outputs a voltage signal ($V_{1st}$) as the detected level of the image-pixel signal derived from said first section, said second level detector outputs a voltage signal ($V_{2nd}$) as the detected level of the image-pixel signal derived from said second section, and said calculator outputs a voltage signal ($V_{1st}-V_{2nd}$) as the differential level between the levels of the voltage signals outputted from said first level-changer and said second level-changer, the respective control voltages ($VC_{1st}$ and $VC_{2nd}$) of said first voltage-controlled amplifier and said second voltage-controlled amplifier being defined as follows:

$$VC_{1st}=(1-WF)V_{1st}+WF*V_{2nd}$$

$$VC_{2nd}=(1-WF)V_{2nd}+WF*V_{1st}$$

where WF represents the weight-factor ($0 \leq WF \leq 1$).

13. An image-pixel signal processor that processes image-pixel signals obtained from an image-sensing area of a solid-type image sensor, which is constructed by combining at least two small-sized solid-type image sensors with each other such that said image-sensing area is formed of a first section and a second section corresponding to image-sensing areas of said small-sized solid-type image sensors, respectively, a vertical boundary being defined between said first section and said second section, said signal processor comprising:

an image-pixel signal reader reading respective series of image-pixel signals, from a leading line of said first section and said second section, by vertically transferring said plurality of image-pixel signals in a line by line succession, and by horizontally transferring a vertically-transferred leading line of said plurality of image-pixel signals, a leading image-pixel signal of the image-pixel signals included in each line being farthest from the vertical boundary between said first section and said second section, a trailing image-pixel signal of the image-pixel signals included in each line being nearest to said vertical boundary; and a regulator correspondingly regulating respective differences between levels of the image-pixel signals in each line, derived from said first section, and the corresponding image-pixel signals in each line, derived from said second section, so that a gradual reduction occurs, resulting in both levels of the trailing image-pixel signals, derived from said first section and said second section, being substantially coincident with each other, wherein said regulator comprises:

a first level-changer that changes a level of each image-pixel signal derived from said first section;

a second level-changer that changes a level of each image-pixel signal derived from said second section;

a first level-detector that detects a level of the image-pixel signal outputted from said first level-changer;

a second level-detector that detects a level of the image-pixel signal outputted from said second level-changer;

a calculator that calculates a differential level between the levels of the image-pixel signals outputted from said first level-changer and said second level-changer; and a weight-factor multiplier that multiplies the differential level by a weight-factor, said weight-factor being cyclically varied from a minimum value to a maximum value in accordance with a series of clock pulses, on the basis of which the vertical transfer of the plurality of image-pixel signals is carried out in each of said first section and said second section, wherein said first level-changer and said second level-changer correspondingly change the levels of the image-pixel signals derived from said first section and said second section on the basis of the differential level multiplied by the cyclically-varied weight-factor, such that the regulation of said respective differences between levels of the image-pixel signals in each line, derived from said first section, and the corresponding image-pixel signals in each line, derived from said second section, is carried out.

14. An image-pixel signal processor as set forth in claim 13, wherein said first level-changer and said second level-changer comprise a first voltage-controlled amplifier and a second voltage-controlled amplifier, and a magnification factor of each voltage-controlled amplifier is controlled in accordance with a variation of an inputted control voltage, the inputted control voltage being set on the basis of the differential level multiplied by the cyclically-varied weight-factor.

15. The image-pixel signal processor of claim 14, wherein said first level detector outputs a voltage signal ($V_{1st}$) as the detected level of the image-pixel signal derived from said first section, said second level detector outputs a voltage signal ($V_{2nd}$) as the detected level of the image-pixel signal derived from said second section, and said calculator outputs a voltage signal ($V_{1st}-V_{2nd}$) as the differential level between the levels of the voltage signals outputted from said first level-changer and said second level-changer, respective control voltages ($VC_{1st}$ and $VC_{2nd}$) of said first voltage-controlled amplifier and said second voltage-controlled amplifier being defined as follows:

$$VC_{1st}=(1-WF)V_{1st}+WF*V_{2nd}$$

$$VC_{2nd}=(1-WF)V_{2nd}+WF*V_{1st}$$

where WF represents the weight-factor ($0 \leq WF \leq 1$).

16. An image-pixel signal processor that processes image-pixel signals obtained from an image-sensing area of a solid-type image sensor, which is constructed by combining at least two small-sized solid-type image sensors with each other such that said image-sensing area is formed of a first section and a second section corresponding to image-sensing areas of said small-sized solid-type image sensors, respectively, a horizontal boundary being defined between said first section and said second section, said signal processor comprising:

an image-pixel signal reader that reads respective series of image-pixel signals, from a leading line of said first and second sections, by vertically transferring said plurality of image-pixel signals in a line by line succession, and by horizontally transferring a vertically-transferred leading line of said plurality of image-pixel signals, a leading series of said plurality of image-pixel signals, first to be horizontally transferred from said first section and said second section, being farthest from the horizontal boundary between said first section and said second section, a trailing series of said plurality of image-pixel signals, last to be horizontally transferred from said first section and said second section, being nearest to said horizontal boundary; and a regulator correspondingly regulating respective differences between levels, represented by the image-pixel signals in respective lines, derived from said first section, and corresponding levels, represented by the image-pixel signals in respective lines, derived from said second section, so that a gradual reduction occurs, resulting in both levels, represented by the image-pixel signals in the trailing lines of said first section and said second section, being substantially coincident with each other, wherein said regulator comprises:

a first level-changer that changes a level of each image-pixel signal derived from said first section;

a second level-changer that changes a level of each image-pixel signal derived from said second section;

a first level-detector that detects a level of the image-pixel signal outputted from said first level-changer;

a second level-detector that detects a level of the image-pixel signal outputted from said second level-changer;

a calculator that calculates a differential level between the levels of the image-pixel signals outputted from said first level-changer and said second level-changer; and a weight-factor multiplier that multiplies the differential level by a weight-factor, said weight-factor being cyclically varied from a minimum value to a maximum value in accordance with a series of clock pulses, on the basis of which the horizontal transfer of the plurality of image-pixel signals is carried out in each of said first section and said second section, wherein said first level-changer and said second level-changer correspondingly change the levels of the image-pixel signals derived from said first section and said second section on the basis of the differential level multiplied by the cyclically-varied weight-factor, such that the regulation of said respective differences between levels of the image-pixel signals in each line, derived from said first section, and the corresponding image-pixel signals in each line, derived from said second section, is carried out.

17. An image-pixel signal processor as set forth in claim 15, wherein said first level-changer and said second level-changer comprise a first voltage-controlled amplifier and a second voltage-controlled amplifier, and a magnification factor of each voltage-controlled amplifier is controlled in accordance with a variation of an inputted control voltage, the inputted control voltage being set on the basis of the differential level multiplied by the cyclically-varied weight-factor.

18. The image-pixel signal processor of claim 17, wherein said first level detector outputs a voltage signal ($V_{1st}$) as the detected level of the image-pixel signal derived from said first section, said second level detector outputs a voltage signal ($V_{2nd}$) as the detected level of the image-pixel signal derived from said second section, and said calculator outputs a voltage signal ($V_{1st}-V_{2nd}$) as the differential level between the levels of the voltage signals outputted from said first level-changer and said second level-changer, respective control voltages ($VC_{1st}$ and $VC_{2nd}$) of said first voltage-controlled amplifier and said second voltage-controlled amplifier being defined as follows:

$$VC_{1st}=(1-WF)V_{1st}+WF*V_{2nd}$$

$$VC_{2nd}=(1-WF)V_{2nd}+WF*V_{1st}$$

where WF represents the weight-factor ($0 \leq WF \leq 1$).

* * * * *